US 11,385,992 B2

(12) United States Patent
Karri et al.

(10) Patent No.: US 11,385,992 B2
(45) Date of Patent: Jul. 12, 2022

(54) WEARABLE DEVICE TEST CASE EXECUTION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Saraswathi Sailaja Perumalla, Visakhapatnam (IN); Danana Sandhya, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 17/023,724

(22) Filed: Sep. 17, 2020

(65) Prior Publication Data
US 2022/0083457 A1    Mar. 17, 2022

(51) Int. Cl.
| G06F 11/36 | (2006.01) |
| G06F 9/451 | (2018.01) |
| G06F 1/16 | (2006.01) |
| G16Y 30/00 | (2020.01) |

(52) U.S. Cl.
CPC .......... *G06F 11/3664* (2013.01); *G06F 1/163* (2013.01); *G06F 9/453* (2018.02); *G06F 11/3688* (2013.01); *G16Y 30/00* (2020.01)

(58) Field of Classification Search
None
See application file for complete search history.

(56) References Cited

U.S. PATENT DOCUMENTS

| 5,753,834 A * | 5/1998 | Stewart .............. G01M 99/001 73/865.3 |
| 10,081,103 B2 * | 9/2018 | Boss ................... G06F 11/2221 |
| 11,106,452 B2 * | 8/2021 | de Jong .............. G06F 11/3664 |
| 2013/0326276 A1 * | 12/2013 | Hu ........................ G06F 11/302 714/37 |
| 2016/0077547 A1 * | 3/2016 | Aimone .............. A61B 5/6814 345/8 |
| 2016/0085366 A1 * | 3/2016 | Chi ........................ G06F 1/163 345/173 |

(Continued)

FOREIGN PATENT DOCUMENTS

WO    2020070758 A3    4/2020

OTHER PUBLICATIONS

Gaglio, "Testing Wearable IoT Applications through Sensor Virtualization", 2020, 24th IMEKO TC4 International Symposium (Year: 2020).*

(Continued)

*Primary Examiner* — Hossain M Morshed
(74) *Attorney, Agent, or Firm* — Brian M. Restauro (57) ABSTRACT

Embodiments of the present invention provide methods, computer program products, and systems. Embodiments of the present invention can, in response to receiving constraints of a test case that test a device, create an artificial interaction that satisfies constraints of the test case. Embodiments of the present invention can then analyze movement information from the created artificial interaction. Embodiments of the present invention can then generate one or more solutions that improve functioning of the device based on the analyzed movement information.

18 Claims, 4 Drawing Sheets

(56) References Cited

U.S. PATENT DOCUMENTS

| | | | | |
|---|---|---|---|---|
| 2017/0146333 | A1* | 5/2017 | Camacho Perez | G06F 3/017 |
| 2017/0364747 | A1* | 12/2017 | Ekambaram | G06V 20/20 |
| 2018/0137034 | A1* | 5/2018 | Bhuiya | G06F 11/3684 |
| 2018/0239961 | A1* | 8/2018 | Ekambaram | G06K 9/6218 |
| 2019/0147655 | A1* | 5/2019 | Galera | G06T 15/20 345/419 |
| 2019/0316991 | A1* | 10/2019 | Nabeshima | G01M 99/007 |
| 2019/0371466 | A1* | 12/2019 | Nicolella | G16H 20/30 |
| 2019/0387168 | A1* | 12/2019 | Smith | G06F 1/163 |
| 2021/0209006 | A1* | 7/2021 | Nanjappan | G06F 11/3684 |
| 2021/0263309 | A1* | 8/2021 | Rivera Cintron | G06F 1/3265 |
| 2021/0327144 | A1* | 10/2021 | Devam | G06T 19/003 |
| 2021/0375121 | A1* | 12/2021 | Bauer | G06F 1/1694 |
| 2022/0083457 | A1* | 3/2022 | Karri | G06F 11/3688 |

OTHER PUBLICATIONS

"Automation Testing of Smartwatches: AutoCast—Summer 2019", QASource Blog, Jul. 24, 2019, 10 pages, <https://blog.qasource.com/automation-testing-of-smart-watch-autocast-summer-2019>.

"The Challenges of Testing Wearable Tech Devices", Posted on Mar. 15, 2018, 5 pages, <https://www.360logica.com/blog/challenges-testing-wearable-tech-devices/>.

Gorobets, Alexandra, "Smart Wearable Device Testing: Main Steps to Cover", Jun. 10, 19, 7 pages.

Hitti, Natashah, Samsung's artificial Neon humans are "a new kind of life", dezeen, Jan. 15, 2020, 8 pages, <https://www.dezeen.com/2020/01/15/samsung-neon-star-labs-artificial-humans/>.

Takahiro et al., "Evaluation of active wearable assistive devices with human posture reproduction using a humanoid robot", Published online: Jun. 29, 2018, 6 pages, <https://www.tandfonline.com/doi/abs/10.1080/01691864.2018.1490200?src=recsys&journalCode=tadr20>.

Yoshida et al., "Towards new humanoid applications: wearable device evaluation through human motion reproduction", Downloaded Sep. 2, 2020, 18 pages.

* cited by examiner

WEARABLE DEVICE TEST CASE EXECUTION

BACKGROUND

The present invention relates in general to test cases and Internet of Things (IoT) devices and in particular to test case execution of wearable devices.

Typically, a test case refers to a specification of the inputs, execution conditions, testing procedure, and expected results that define a single test that is executed. These test cases can be designed to verify compliance with a specific requirement or test limitations of a certain function or feature. Other objectives can include a test to exercise a particular program path. Multiple test cases can be generated to produce the desired coverage of the software being tested.

In general, there are two approaches to designing test cases: formal and informal. A formal written test-case is characterized by a known input and by an expected output, which is worked out before the test is executed. The known input should test a precondition and the expected output should test a postcondition. Formally defined test cases allow the same tests to be run repeatedly against successive versions of the software, allowing for effective and consistent regression testing. Test cases can be written based on the accepted normal operation of programs of a similar class. Conversely, informal testing can be written based on the accepted normal operation of programs of a similar class.

In order to fully test that all the requirements of an application are met, there must be at least two test cases for each requirement: one positive test and one negative test. If a requirement has sub-requirements, each sub-requirement must have at least two test cases. Keeping track of the link between the requirement and the test is frequently done using a traceability matrix. Written test cases should include a description of the functionality to be tested, and the preparation required to ensure that the test can be conducted.

Wearable technology are smart electronic devices (e.g., electronic device with micro-controllers) that are worn close to or on the surface of a user's skin. Wearable devices can detect, analyze, and transmit information concerning (e.g., body signals such as vital signs, and ambient data) which allow in some cases immediate biofeedback to the wearer. Wearable devices such as activity trackers are an example of the Internet of Things (IoT) such as electronics, software, sensors, and connectivity are effectors that enable objects to exchange data (including data quality) through the internet with a manufacturer, operator, and other connected devices, without requiring human intervention.

A digital twin is a digital replica of a living or non-living physical entity. In general, a digital twin refers to a digital replica of potential and actual physical assets (physical twin), processes, people, places, systems and devices that can be used for various purposes. The digital representation provides both the elements and the dynamics of how an Internet of things device operates and lives throughout its life cycle.

Digital twins have two main characteristics: a connecting between the physical model and the corresponding virtual model or counterpart, and that this connection is established by generating real-time data using sensors. In general, digital twins integrate IoT, artificial intelligence, machine learning and software analytics with spatial network graphs to create living digital simulation models that update and change as their physical counterparts change. A digital twin continuously learns and updates itself from multiple sources to represent its near real-time status, working condition or position. This learning system learns from itself, using sensor data that conveys various aspects of its operating condition, from human experts, such as engineers with deep and relevant industry domain knowledge, from other similar machines, from other similar fleets of machines, and from the larger systems and environment of which it may be a part. A digital twin also integrates historical data from past machine usage to factor into its digital model.

SUMMARY

According to an aspect of the present invention, there is provided a computer-implemented method. The method comprises in response to receiving constraints of a test case that test a device, creating an artificial interaction that satisfies constraints of the test case; analyzing movement information from the created artificial interaction; and generating one or more solutions that improve functioning of the device based on the analyzed movement information

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that wearable technology devices rely on gesture-controlled movement to perform one or more functions. For example, a screen can be configured to be display a lit screen based on a user's arm movement (e.g., a raise to "wake up" a screen feature). As such, embodiments of the present invention recognize the need to test these gesture-controlled functions. Often times, test cases designed to test these mobility (e.g., using gestures and movement) based functions are time consuming and often require actual users to perform movements. As such, embodiments of the present invention provide solutions to decrease the amount of time it takes for test case validation using an artificial human and digital twin devices. For example, embodiments of the present invention can receive a test case, create an interaction mechanism, and analyze the interaction. Embodiments of the present invention can then identify deviations in movement between the artificial human and mobility signals generated by the digital twin, validate results of the performed movement, as discussed in greater detail later in the Specification. In scenarios where the test case fails, embodiments of the present invention can generate new test cases and execute the generated test cases. Embodiments of the present invention can also diagnose inputs that affected performance and suggest one or more alternative actions that, when implemented improve performance of the wearable device and pass the test case.

Figure 1:
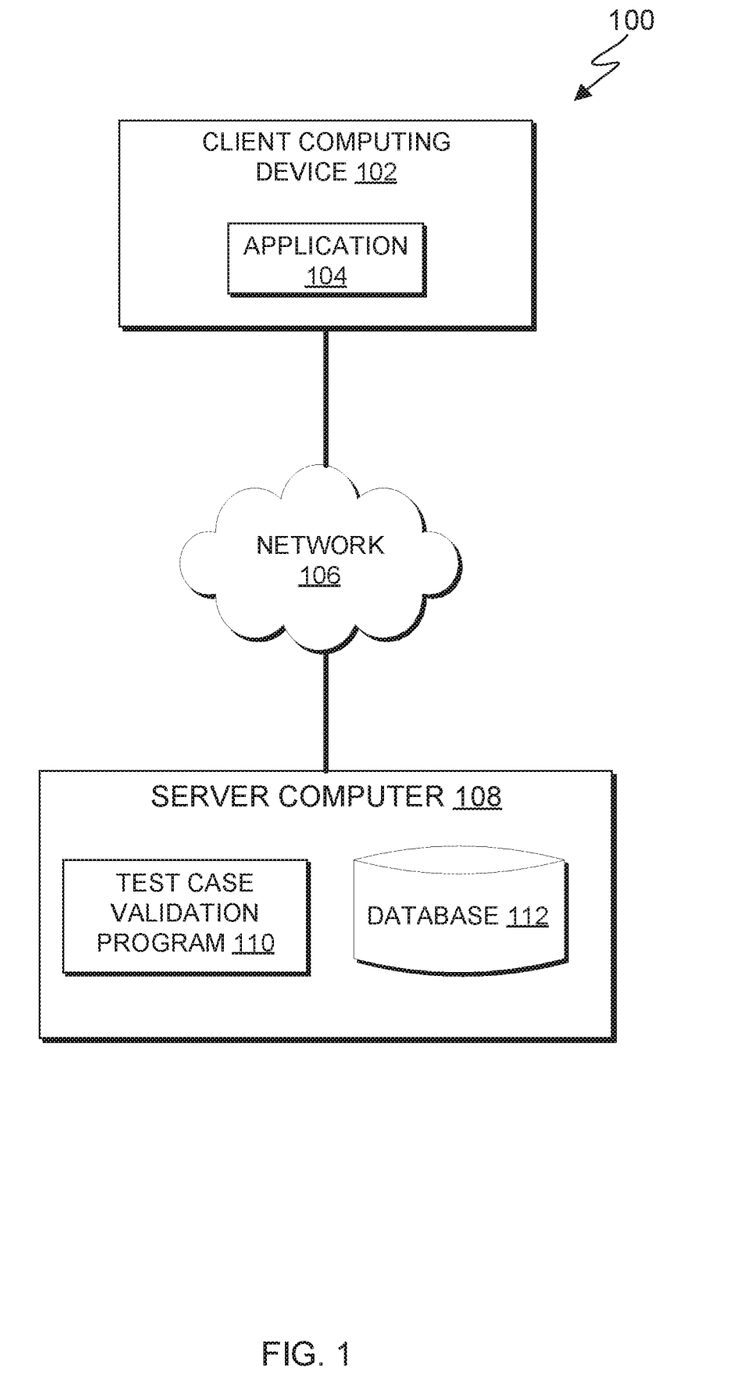
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access test case validation program 110 (e.g., using TCP/IP) to access content, user information, and database information. Application 104 can further communicate with test case validation program 110 to transmit instructions execute test cases, analyze results of test cases, and perform one or more ameliorative actions, as discussed in greater detail with regard to FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts test case validation program 110 and database 112. In this embodiment, test case validation program 110 resides on server computer 108. In other embodiments, test case validation program 110 can have an instance of the program (not shown) stored locally on client computer device 102. In yet other embodiments, test case validation program 110 can be stored on any number or computing devices.

In this embodiment, test case validation program 110 execute test cases, analyze results of test cases, and perform one or more ameliorative actions. In this embodiment, test case validation program 110 can include modules that for an artificial human, that is a simulated user, (not shown), an artificial intelligence module (not shown), and an associated digital twin model of a wearable device (also not shown). In other embodiments, test case validation program 110 can manage and control an artificial human wearing a digital twin model of a wearable device. In either embodiment, test case validation program 110 can monitor and track mobility parameters of a received test case using feedback (i.e., information) generated from the interaction between the artificial human and the associated, wearable device. In this embodiment, test case validation program 110 shows only one simulated user module and a respective wearable device, however, it should be understood that test case validation program 110 can include one or more simulated user modules wearing any number of wearable devices and interacting with one or more other simulated user modules.

In this embodiment, test case validation program 110 can receive a test case and transmit context data to the artificial human module to simulate environment conditions. Examples of context data can include interactions with one or more other artificial humans, environmental data (e.g., to simulate hot, cold, rain, dry conditions, etc.), activity data (e.g., performing a sport or movement). In this manner, test case validation program 110 can simulate weather related deviations (e.g., different seasons) leveraging the digital twin of the wearable device to generate metrics on wearable device performance. For example, test case validation program 110 can generate performance metrics for components that include strap behavior (e.g., sweat, tightness, irritation, etc.), dial or display behavior like (e.g., dim or more bright) etc., battery drainage (e.g., fast discharge when a certain temperature is reached or exceeded) and user uncomfortableness for the above said cases and recommend changes to wearable devices and components. In some embodiments, test case validation program 110 can receive IoT feeds from various other connected devices and the interaction information of respective user interactions via gestures, mobility etc. for different climatic conditions and contexts and there by simulate for better wearable device performance.

In response to receiving a test case, test case validation program 110 can recreate parameters of the test case and create an interaction between simulated users. An "interaction," as used herein, refers to as a communication with, direct involvement or any action that occurs as two or more simulated users influence one other. Examples of an interaction can include any motion associated with or performed in furtherance of an activity such as a greeting, clapping, dancing, laughing, etc. An activity can include any movements associated with performing the activity. For example, where the activity is a sport such as swimming, test case validation program 110 identifies movements and or gestured performed during the specified activity as a swimming associated or gesture associated with swimming.

An interaction can also describe an interaction between an associated digital twin and its respectively associated simulated user. For example, an interaction can include any electronic signals generated by the digital twin during a motion or movement performed by the simulated user.

In this embodiment, test case validation program 110 can then track mobility movement of the digital twin of wearable device generated by the interaction parameters. In this embodiment, test case validation program 110 tracks mobility movement of the digital twin of the wearable device by transmitting instructions to the digital twin to send mobility information to test case validation program 110. Test case validation program 110 can then map mobility information and discern a pattern to the movements from the received mobility information.

Test case validation program 110 can then validate the tracked mobility pattern by comparing the digital signal generated by the digital twin of the wearable device with movement information associated with the simulated user.

In this embodiment, test case validation program 110 can then perform one or more ameliorative actions. An ameliorative action, as used herein, is any action or recommendation that, when performed, improves functioning of the wearable device or improves a user experience with the device. For example, based on the test results, test case validation program 110 can consider each respective user's individualized movement data from historical usage passage and dynamically recommend positioning of the wearable device that is optimal for the activity being performed by the user.

Test case validation program 110 can then generate recommendations and subsequently alter existing media (e.g., user manuals, videos, presentations, audio books, etc.). In other embodiments, test case validation program 110 can generate media associated with the wearable device and create a user manual, video, presentation, a tutorial, audio book, etc. to instruct users on proper wear and care of the wearable device.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
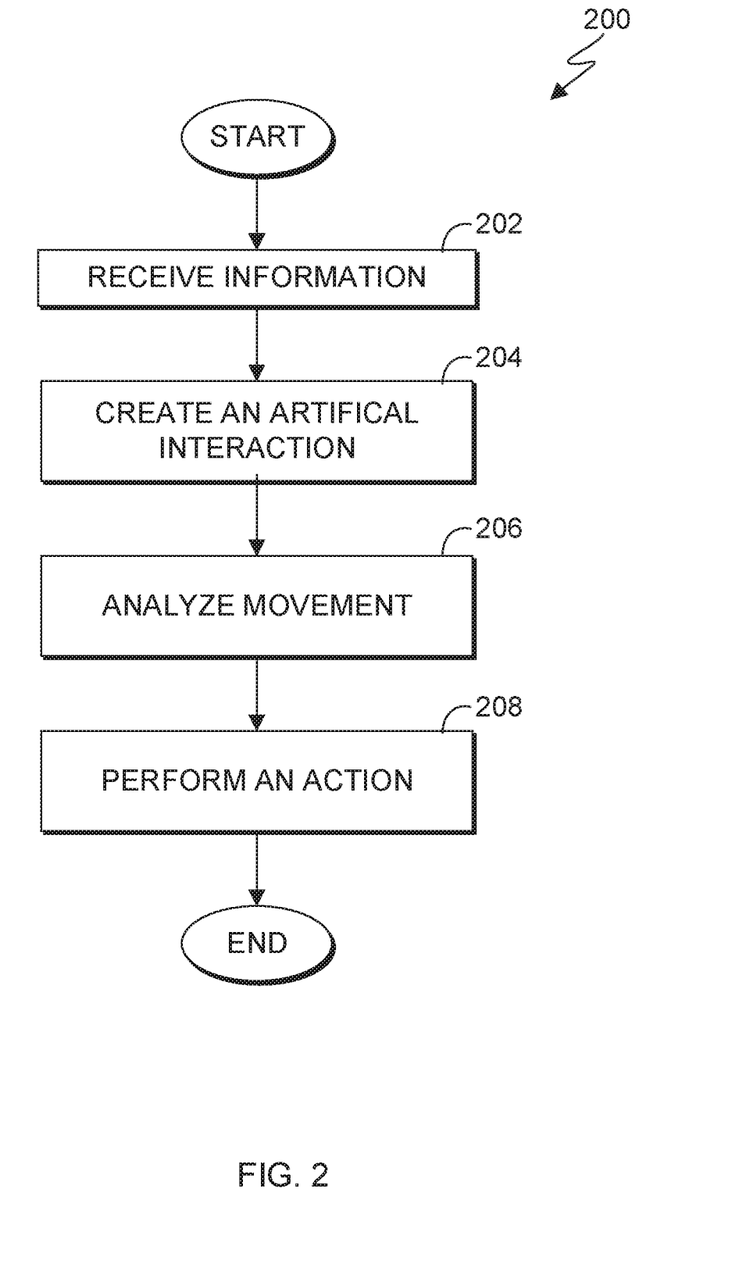
FIG. 2 is a flowchart depicting operational steps for test case validation, in accordance with an embodiment of the present invention.

FIG. 2 is a flowchart 200 depicting operational steps for test case validation, in accordance with an embodiment of the present invention.

In step 202, test case validation program 110 receives information. In this embodiment, test case validation program 110 receives information from client computing device 102. In other embodiments, test case validation program 110 can receive information from one or more other components of computing environment 100.

As used herein, "information" refers to one or more test cases and context data associated with respective test cases. A test case can be formal or informal. For example, a test case can be designed to test performance of components of a wearable device (e.g., strap placement, comfortability, behavior, etc.) in one or more conditions (e.g., heat, cold, dry, etc.). For example, a test case may include a specific activity or movement design to test one or more components of the wearable device. In certain circumstances, a test case may include a requirement for a simulated user to interact with another simulated user controlled by a different artificial intelligence module. Information can also include specified placements of a wearable device and include other constraints (e.g., requirements). For example, other requirements can specify that a simulated user test more than one wearable device at respective portions of the simulated user.

As mentioned before examples of context data can include interactions with one or more other artificial humans, environmental data (e.g., to simulate hot, cold, rain, dry conditions, etc.), activity data (e.g., performing a sport or movement). In some embodiments, information received by test case validation program 110 can include IoT feeds from various other connected devices and the interaction information of respective user interactions via gestures, mobility etc. for different climatic conditions and contexts and there by simulate for better wearable device performance.

In step 204, test case validation program 110 creates an artificial interaction. In this embodiment, test case validation program 110 creates an artificial interaction leveraging one or more artificial intelligence algorithms. For example, test case validation program 110 can analyze the received test case and context data and create mobility information for the simulated user. In this embodiment, mobility information of the user can be expressed as one or more movements or gestures performed by a simulated user associated with a digital twin of a wearable device. Other movements can include collaboration and/or interaction with other simulated users. Movements can further include any motion performed in furtherance of an activity such as walking, playing, dancing, running, skipping, jogging, throwing, etc. test case validation program 110 can then transmit instructions to the digital twin placed on the simulated user to track motion associated with an activity.

In step 206, test case validation program 110 analyzes movement. In this embodiment, test case validation program 110 analyzes movement performed during the artificial interaction leveraging one or more artificial intelligence algorithms as described in greater detail with respect to FIG. 3. For example, test case validation program 110 can receive movement information, identify positioning of the simulated user and position information of the digital twin of the wearable device, consider context data that affects movement of the simulated user and the digital twin, generates mobility signals based on performed movement, identify deviations between performed movement and generated mobility signals, and validate results as described in greater detail with respect to FIG. 3.

In step 208, test case validation program 110 performs an action. In this embodiment, test case validation program 110 performs an ameliorative action by generating one or more recommendations to improve performance of the wearable device. For example, test case validation program 110 can generate a recommendation for an optimal position to place a wearable device to get more accurate readings (e.g., heart rate, blood pressure, etc.).

In certain circumstances, test case validation program 110 can generate and subsequently publish media that is displayed on a user interface of a computing device. For example, in certain embodiments, test case validation program 110 can generate an augmented reality display that details placement of the wearable device and shows simulations of use of the wearable device.

In general, an ameliorative action is any action or recommendation that, when performed, improves functioning of the wearable device or improves a user experience with the device. For example, based on the test results, test case validation program 110 can consider each respective user's individualized movement data from historical usage passage and dynamically recommend positioning of the wearable device that is optimal for the activity being performed by the user.

In some embodiments, an ameliorative action can include a unique analysis of a user movement. For example, based on the movement patter. of the simulated user, test case validation program 110 identifies that some types of body part (e.g., muscle movement on leg) can be correlated with movements associated with a walking pattern. From there, test case validation program 110 can identify a unique walking style or pattern for a respective simulated user. In another example, test case validation program 110 can identify what types of muscles are movement while performing specific movements. In some embodiments, test case validation program 110 can provide recommendations for types of sensors or types of modifications that can be made to sensors to track such movement.

Figure 3:
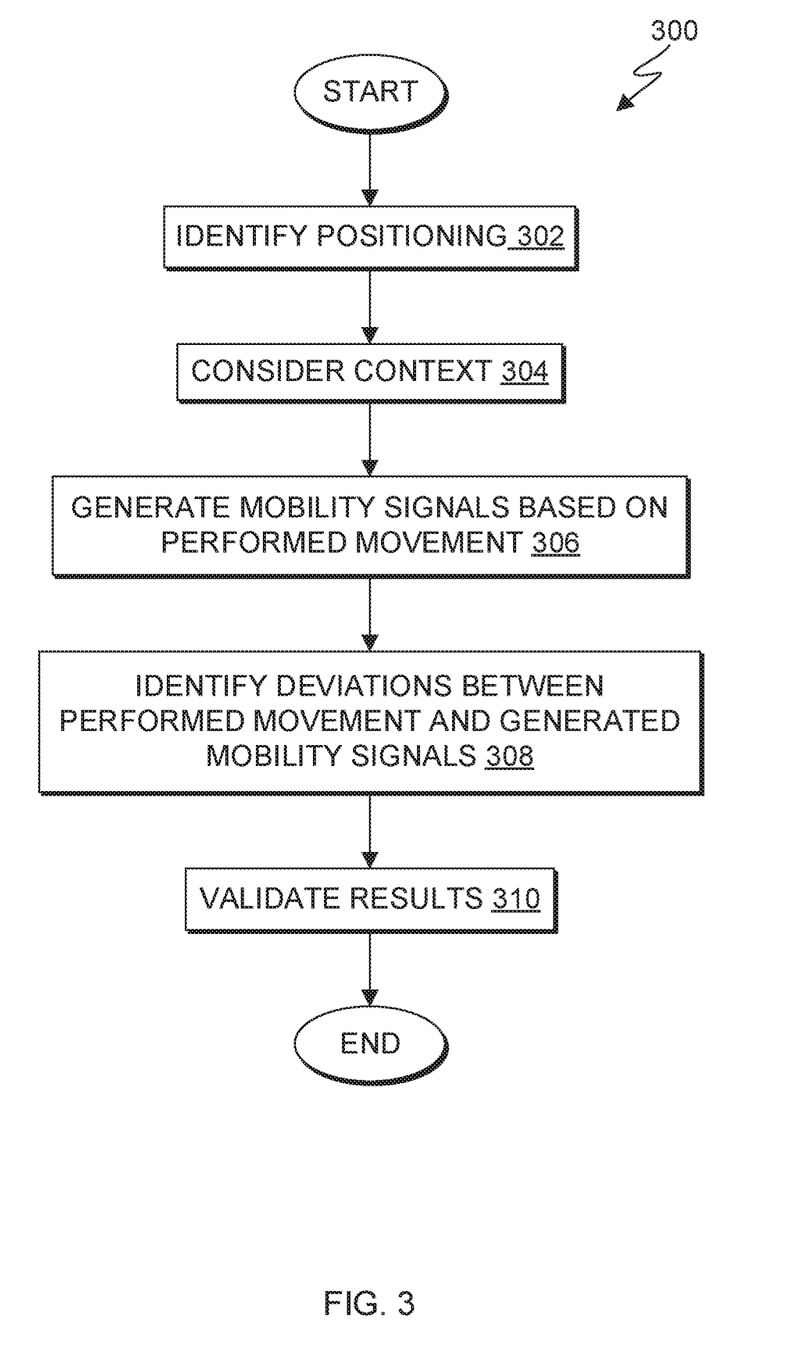
FIG. 3 is a flowchart depicting operational steps for analyzing an artificial interaction, in accordance with an embodiment of the present invention.

FIG. 3 is a flowchart 300 depicting operational steps for analyzing an artificial interaction, in accordance with an embodiment of the present invention.

In step 302, test case validation program 110 identifies positioning. In this embodiment, test case validation program 110 identifies positioning information of the simulated user and the respectively associated digital twin. In this embodiment position, or positioning information for a wearable device or digital twin of the wearable device refers to placement of the digital twin on a simulated user. For example, where the simulated user mimics a human, placement of the digital twin can include placement on one or more limbs of the simulated user and/or one or more appendages of the simulated user.

In step 304, test case validation program 110 considers context. In this embodiment, test case validation program 110 considers context by referencing the received test case parameters and other received information (e.g., from IoT feeds). Test case validation program 110 can further consider interactions with one or more other artificial humans, environmental data (e.g., to simulate hot, cold, rain, dry conditions, etc.), activity data (e.g., performing a sport or movement).

In step 306, test case validation program 110 generates mobility signals based on performed movement. In this embodiment, test case validation program 110 generates mobility signals based on performed movement by receiving generated mobility signals from the digital twin during execution of the test case. In this embodiment, a digital twin can generate a corresponding mobility signal for each movement the digital twin makes. For example, the digital twin can generate a mobility signal for movement from a starting position and a corresponding mobility signal that denotes return to the starting position (e.g., a mobility signal that denotes a wave of a hand). The mobility signal can also denote movement from an initial placement of the digital twin. For example, the digital twin can be identified as being placed on the simulated user's wrist. The digital twin can generate a mobility signal that reflects a three-degree movement from the wrist (e.g., indicating a possible loose strap).

In step 308, test case validation program 110 identifies deviations between performed movement and generated mobility signals. In this embodiment, test case validation program 110 identifies deviations between performed movement and generated mobility signals by comparing actual performance of the simulated user to each of the generated mobility signals, generated by the digital twin. In this embodiment, test case validation program 110 uses a threshold percentage for accuracy to determine whether deviations are acceptable or not acceptable. For example, test case validation program 110 can use a threshold percentage of eighty percent to measure acceptable deviations, that is, test case validation program 110 can identify that a movement and digital signal is within an acceptable degree difference if, it meets or exceeds the threshold percentage.

In step 310, test case validation program 110 validates results. In this embodiment, test case validation program 110, validates the results utilizing one or more artificial intelligence algorithms. For example, test case validation program 110 can compare results of an executed test case against known movements (e.g., previously tracked and stored movements of a simulated user) and compare whether the movements or gestured identified from different simulated user can be detected (e.g., matched). In response to the movements or gestures matching, test case validation program 110 can validate the results, that is, validate that the gesture or movement is detected. If the movements or gestures do not match, test case validation program 110 can generate one or more solutions and actions as previously described in step 208 of flowchart 200.

Figure 4:
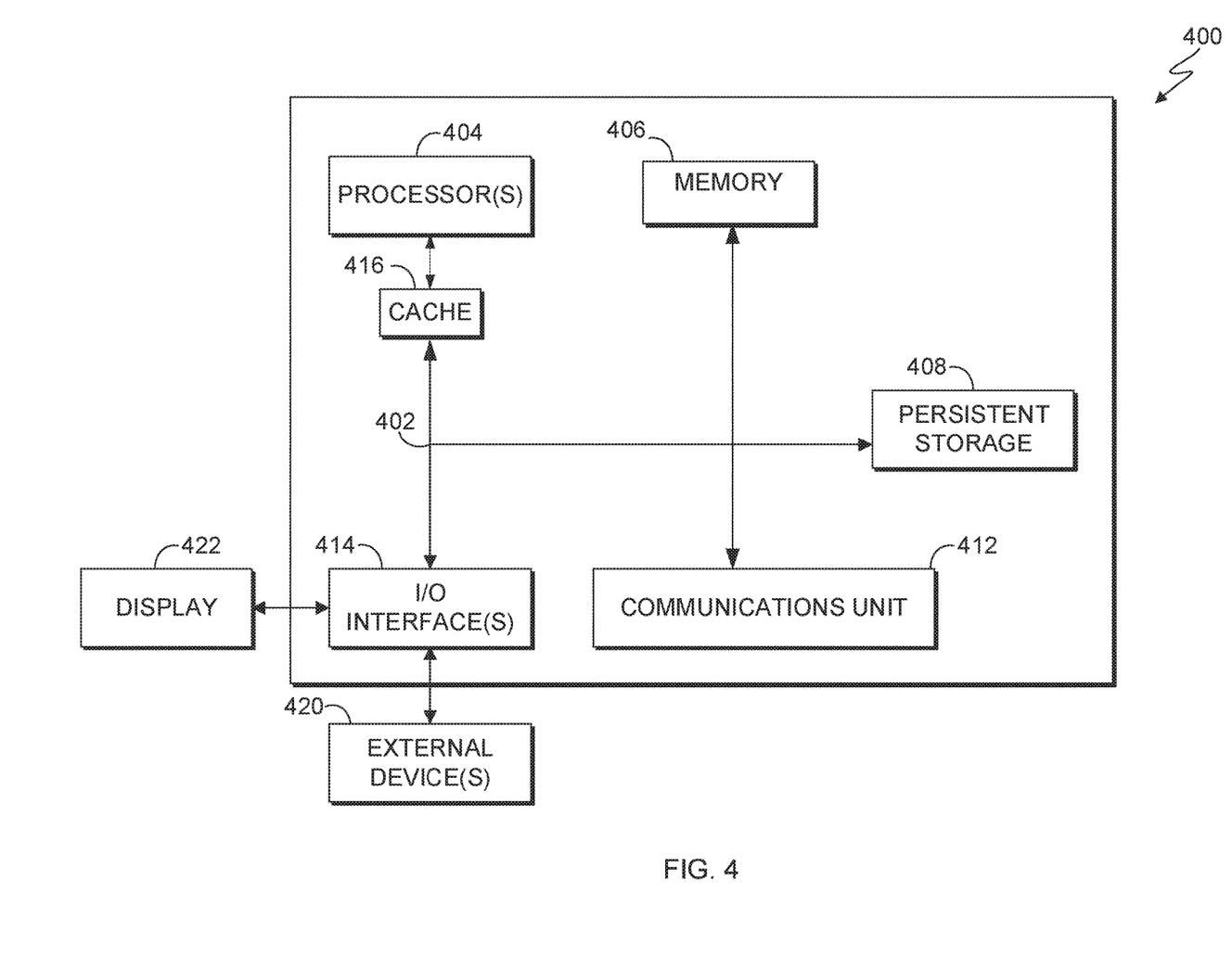
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Test case validation program 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Test case validation program 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., test case validation program 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to receiving constraints of a test case that test a device, creating an artificial interaction comprising generated mobility signals that simulate movement of a user and context data that simulates environment conditions that satisfies constraints of the test case;
   analyzing movement information from the created artificial interaction by identifying deviations between performed movement of the user and the generated mobility signals that simulate movement of the user during the artificial interaction; and
   generating one or more solutions that improve functioning of the device based on the analyzed movement information, wherein generating one or more solutions includes generating media associated with the device.

2. The computer-implemented method of claim 1, further comprising: generating performance metrics of components of the device.

3. The computer-implemented method of claim 1, further comprising: validating results of an implemented test case.

4. The computer-implemented method of claim 1, further comprising:
   identifying position information of a simulated user and a respectively associated device, wherein the respectively associated device is a wearable device.

5. The computer-implemented method of claim 1, further comprising:
   generating media that is displayed on a user interface that depicts a tutorial for the device.

6. The computer-implemented method of claim 1, wherein the device is a digital twin of the device.

7. The computer-implemented method of claim 1, further comprising:
   altering existing media associated with the device based on a comparison of the generated mobility signals associated with the artificial interaction and performed movement of the user associated with the device.

8. A computer program product comprising:
   one or more computer readable storage media and program instructions stored on the one or more computer readable storage media, the program instructions comprising:
   program instructions to, in response to receiving constraints of a test case that test a device, create an artificial interaction comprising generated mobility signals that simulate movement of a user and context data that simulates environment conditions that satisfies constraints of the test case;
   program instructions to analyze movement information from the created artificial interaction by identifying deviations between performed movement of the user and the generated mobility signals that simulate movement of the user during the artificial interaction; and
   program instructions to generate one or more solutions that improve functioning of the device based on the analyzed movement information, wherein generating one or more solutions includes generating media associated with the device.

9. The computer program product of claim 8, wherein the program instructions stored on the one or more computer readable storage media further comprise:
   program instructions to generate performance metrics of components of the device.

10. The computer program product of claim 8, wherein the program instructions stored on the one or more computer readable storage media further comprise:
    program instructions to validate results of an implemented test case.

11. The computer program product of claim 8, wherein the program instructions stored on the one or more computer readable storage media further comprise:
    program instructions to identify position information of a simulated user and a respectively associated device, wherein the respectively associated device is a wearable device.

12. The computer program product of claim 8, wherein the program instructions stored on the one or more computer readable storage media further comprise:
    program instructions to generate media that is displayed on a user interface that depicts a tutorial for the device.

13. The computer program product of claim 8, wherein the device is a digital twin of the device.

14. A computer system for comprising:
    one or more computer processors;
    one or more computer readable storage media; and
    program instructions stored on the one or more computer readable storage media for execution by at least one of the one or more computer processors, the program instructions comprising:
    program instructions to, in response to receiving constraints of a test case that test a device, create an artificial interaction comprising generated mobility signals that simulate movement of a user and context data that simulates environment conditions that satisfies constraints of the test case;
    program instructions to analyze movement information from the created artificial interaction by identifying deviations between performed movement of the user and the generated mobility signals that simulate movement of the user during the artificial interaction; and program instructions to generate one or more solutions that improve functioning of the device based on the analyzed movement information, wherein generating one or more solutions includes generating media associated with the device.

15. The computer system of claim 14, wherein the program instructions stored on the one or more computer readable storage media further comprise:
   program instructions to generate performance metrics of components of the device.

16. The computer system of claim 14, wherein the program instructions stored on the one or more computer readable storage media further comprise:
   program instructions to validate results of an implemented test case.

17. The computer system of claim 14, wherein the program instructions stored on the one or more computer readable storage media further comprise:
   program instructions to identify position information of a simulated user and a respectively associated device, wherein the respectively associated device is a wearable device.

18. The computer system of claim 14, wherein the program instructions stored on the one or more computer readable storage media further comprise:
   program instructions to generate media that is displayed on a user interface that depicts a tutorial for the device.

* * * * *